March 3, 1959     H. J. HALL     2,876,273
REFERENCE CELL HOLDER
Filed April 2, 1957

INVENTOR.
Hugh J. Hall
BY
Attorney

United States Patent Office 2,876,273
Patented Mar. 3, 1959

2,876,273

REFERENCE CELL HOLDER

Hugh J. Hall, Los Altos, Calif., assignor to Varian Associates, Palo Alto, Calif., a corporation of California Application April 2, 1957, Serial No. 650,157

5 Claims. (Cl. 136—169)

The present invention relates in general to battery holders and in particular to a novel reference cell holder adapted for panel mounting and serving to facilitate replacement of reference cells, which in many equipments is a periodic maintenance task. The present invention is useful in many equipments utilizing reference cells such as, for example, recorders, potentiometers, and the like.

Heretofore reference cells have been held by clamps and similar arrangements in remote locations of the apparatus. This type of reference cell mounting is difficult to reach making it extremely difficult to replace the reference cell.

The present invention provides a novel spring loaded reference cell holder apparatus which is adapted to be mounted in a front panel thereby facilitating access and rapid replacement of reference cells without the necessity, in many instances, of taking off the back cover of the instrument to replace the reference cell.

The principal object of the present invention is to provide a novel method and apparatus for holding and mounting a reference cell in an equipment whereby rapid replacement of the reference cell is greatly facilitated.

One feature of the present invention is the provision of a reference cell holder having a longitudinal bore therein and containing an electrical conducting strip member having an inwardly protruding spring portion carried longitudinally within the bore adapted to receive the reference cell, whereby as the reference cell is inserted into the bore a good electrical connection is assured between the reference cell and the electrical conducting strip member forming one terminal of the apparatus.

Another feature of the present invention is the provision of a spring loaded terminal in the end wall of the reference cell holder whereby good electrical contact is assured between the center electrode of the reference cell and the terminal and whereby, due to the spring loading, replacement of the reference cell is facilitated.

Another feature of the present invention is the provision of a flanged portion on the reference cell holder whereby panel mounting is greatly facilitated.

Figure 1:
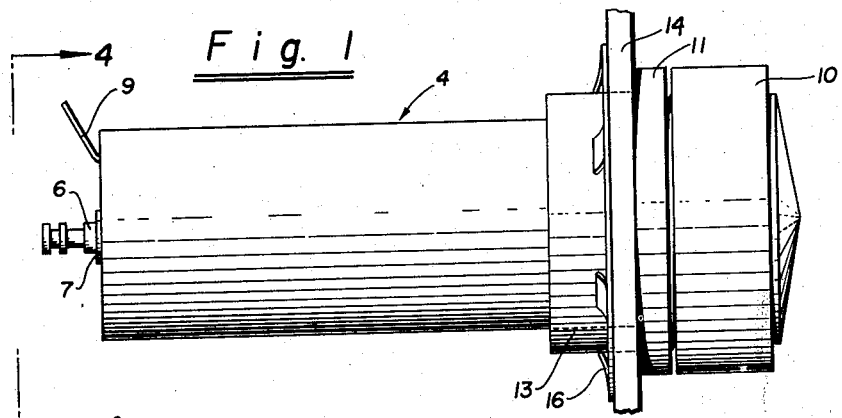
Figure 2:
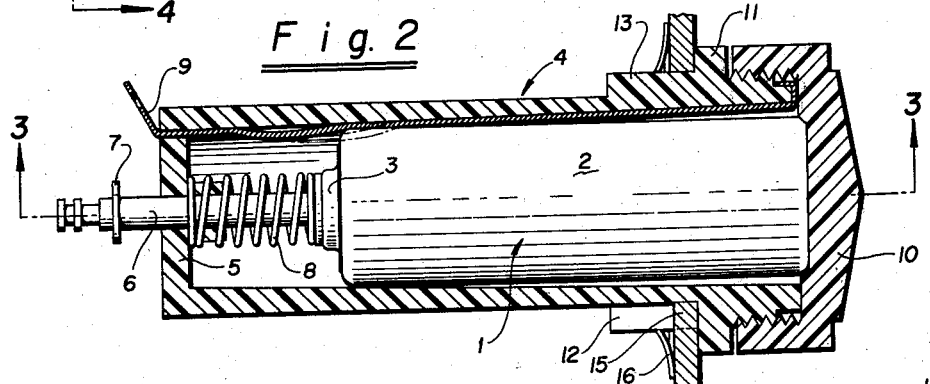
Figure 3:
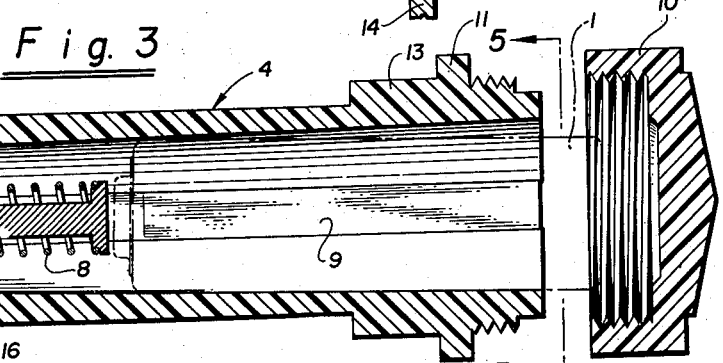
Figures 4, 5:
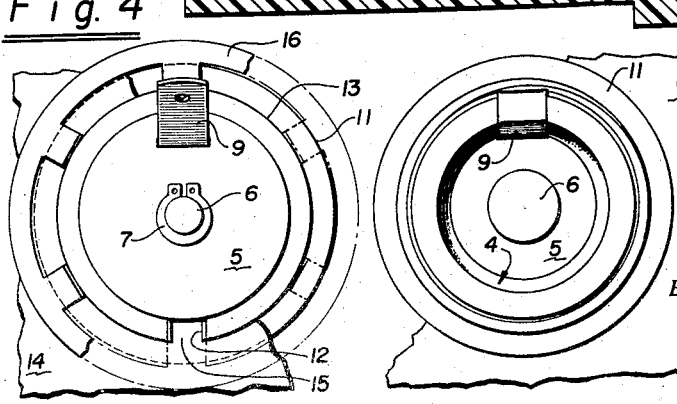

Other features and advantages of the present invention will be more apparent after a perusal of the following specification taken in connection with the accompanying drawings wherein Fig. 1 is a side elevation view of the novel reference cell holder of the present invention, Fig. 2 is a cross-sectional view of the structure of Fig. 1, Fig. 3 is a cross-sectional view of the structure of Fig. 2 taken along line 3—3 in the direction of the arrows, Fig. 4 is an end view of the structure of Fig. 1, partly in section taken along line 4—4 in the direction of the arrows, and Fig. 5 is an end view of the structure of Fig. 3 taken along line 5—5 in the direction of the arrows.

Referring now to Figs. 1 through 5 there is shown the apparatus of the present invention. A reference cell 1 having an outer electrode 2 forming the shell and an insulated center electrode 3 is carried within a hollow cylindrical dielectric reference cell holder 4 as of, for example, general purpose phenolic or nylon. The hollow cylindrical reference cell holder 4 is closed off at one end by a transverse wall 5 which is suitably apertured to permit two electrodes to pass therethrough. One of these electrodes is a centrally disposed terminal post 6. The center post 6 is flanged at one end and provided with a gripping ring 7 at the other end serving to retain the center terminal post to within a certain degree of longitudinal displacement.

A compression spring 8 is concentrically disposed of the center terminal post 6 and abuts the transverse closing wall 5 of the reference cell holder 4 at one end and the flanged portion of the terminal post 6 at the other end thereby serving to urge the post inwardly of the reference cell holder 4. The other electrode that passes through the transverse closing wall 5 is a conducting strip electrode 9 and comprises a strip of resilient conducting material as of, for example, Phosphor bronze or beryllium copper which extends along the inside wall of the reference cell holder. The strip electrode 9 is affixed to the cell holder 4 by looping back on itself forming a hook at one end thereof for grasping the side wall of the reference cell holder 4. The other free end of the strip electrode 9 external of the cell holder 4 is bent up to retain the electrode 9 in position.

The conducting strip electrode 9 has a portion of its length, contained within the reference cell holder 4, inwardly protruding thereby forming a spring-like contact for contacting the outer shell of the reference cell when it is inserted within the reference cell holder 4. The spring-like contact portion assures a good electrical connection between the strip electrode 9 and the outer electrode 2 of the reference cell 1.

The central spring loaded terminal post 6 makes good electrical contact with the center electrode 3 of the reference cell 1 thereby completing the connection of the reference cell 1 to the electrodes 6 and 9. The reference cell 1 is held and retained in position within the reference cell holder 4 via a cap 10 which is screwed onto the open end of the reference cell holder thereby closing off the reference cell holder 4.

A shoulder 11 is provided on the outside circumference of the reference cell holder 4 near the open end thereof to facilitate panel mounting. A key slot 12 is provided in the reference cell holder 4 extending longitudinally thereof into a second shoulder 13 of the reference cell holder 4. In this manner the reference cell holder 4 is adapted for mounting in a panel 14 having a circular hole cut therein and said panel having a key 15 extending radially inwardly of the circular hole. When mounted in the panel the first shoulder 11 of the reference cell holder abuts one side of the panel 14 and the panel key 15 rides within the key slot 12 to thereby prevent angular rotation of the cell holder 4.

A gripping retaining washer 16 is positioned on the back side of the panel in gripping surrounding relationship to the second shoulder 13 of the cell holder 4 and abutting the backside of the panel 14 whereby the reference cell holder 4 is firmly restrained from longitudinal movements within the mounting hole in the panel 14.

To connect a circuit to the reference cell 1 the user need only connect to the two protruding electrodes 6 and 9. To remove and replace the reference cell the cap 10 is unscrewed and due to the spring loading of the central terminal post 6 the reference cell 1 is moved a convenient distance outwardly of the reference cell holder 4 to facilitate gripping of the reference cell and replacement thereof.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A reference cell holder apparatus including, a hollow reference cell holder open at one end and adapted to slideably receive therewithin and substantially from the open end thereof a reference cell, an electrically conducting terminal post axially disposed of and carried within said reference cell holder for making electrical contact with the center electrode of the reference cell, a spring coupled to said terminal post for urging said post inwardly of said reference cell holder, an electrical conductor made of a resilient material and carried within the interior of said reference cell holder substantially along one side wall thereof and having a portion thereof inwardly tensioned of the reference cell holder for slideably contacting the outer conducting shell of the reference cell, a portion of said conductor extending outwardly of said reference cell holder, and means for closing off the open end of said reference cell holder and for retaining the reference cell therewithin.

2. The apparatus according to claim 1 wherein said hollow reference cell holder includes a substantially circular inwardly converging bore therewithin for receiving slideably therewithin from the open end thereof the reference cell, whereby when said means for closing off said reference cell holder and for retaining the reference cell therewithin is removed, said spring will readily urge the reference cell outwardly of said holder thereby facilitating grasping and replacement of the reference cell.

3. An apparatus as claimed in claim 1 including means for mounting said reference cell holder with its longitudinal axis disposed substantially perpendicularly to and within an apertured mounting panel, and means for forceably engaging and holding said reference cell holder within the apertured mounting panel substantially at the open end portion of said reference cell holder whereby said means for closing off said reference cell holder is disposed in close spatial relationship to the mounting panel and the larger portion of said reference cell holder protrudes from the backside of the mounting panel.

4. Apparatus according to claim 1 wherein said hollow reference cell holder has a portion of its length having a substantially circular physical configuration for bearing in slideable engagement with the inside diameter of a circular bore in a mounting panel, an external flange contained on said reference cell holder for abutting against the front side of the mounting panel, and a gripping retaining washer positioned circumscribing said reference cell holder abutting the backside of the mounting panel and gripping said reference cell holder against axial movement thereof within the mounting panel.

5. Apparatus according to claim 4 including a key slot provided in said reference cell holder for slideably mating with a key carried from the mounting panel thereby serving to prevent angular displacement of said reference cell holder when mounted in the mounting panel.

References Cited in the file of this patent

UNITED STATES PATENTS

| | | |
|---|---|---|
| 1,264,520 | Holmes | Apr. 30, 1918 |
| 1,497,786 | Hoge | June 17, 1924 |
| 2,007,203 | Kraeft | July 9, 1935 |